United States Patent
Carey et al.

(10) Patent No.: US 6,874,459 B2
(45) Date of Patent: *Apr. 5, 2005

(54) MODIFICATION OF LUBRICANT PROPERTIES IN AN OPERATING ALL LOSS LUBRICATING SYSTEM

(75) Inventors: Vincent M. Carey, Sewell, NJ (US); Kevin John Kelly, Mullica Hill, NJ (US); Kevin L. Crouthamel, Rushland, PA (US); Keith P. Saddler, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/350,563

(22) Filed: Jan. 24, 2003

(65) Prior Publication Data

US 2003/0159672 A1 Aug. 28, 2003

Related U.S. Application Data

(60) Provisional application No. 60/361,376, filed on Feb. 26, 2002.

(51) Int. Cl.[7] ............................................. F01M 9/02
(52) U.S. Cl. ................................................. 123/196 R
(58) Field of Search .......................... 123/196 R, 196 S

(56) References Cited

U.S. PATENT DOCUMENTS

| 4,100,082 | A | * | 7/1978 | Clason et al. ............... 508/412 |
| 4,506,337 | A | * | 3/1985 | Yasuhara ..................... 701/30 |
| 5,067,455 | A | * | 11/1991 | Okajima et al. ......... 123/196 R |
| 5,568,842 | A | * | 10/1996 | Otani ......................... 184/6.22 |
| 6,019,196 | A | * | 2/2000 | Selby et al. ................. 184/1.5 |
| 6,079,380 | A | * | 6/2000 | Jorgensen et al. ...... 123/73 AD |
| 6,408,812 | B1 | * | 6/2002 | Chamberlin et al. .... 123/196 R |
| 6,412,468 | B1 | * | 7/2002 | Pudelski et al. ........ 123/196 R |
| 6,588,393 | B2 | * | 7/2003 | Chamberlin et al. .... 123/196 R |

FOREIGN PATENT DOCUMENTS

| EP | 0049603 | 4/1982 | |
| JP | 10117766 | 10/1999 | ............ F01M/1/06 |

* cited by examiner

*Primary Examiner*—Henry C. Yuen
*Assistant Examiner*—Jason Benton
(74) *Attorney, Agent, or Firm*—Norby L. Foss; Joseph J. Dvorak

(57) ABSTRACT

A device and a method for the modification of an operating all-loss engine lubricant's properties in response to actual engine operating conditions. The present invention is a method that comprises (1) monitoring the specific engine parameter(s) of interest, or in the alternative, predicting those parameter(s) from other engine inputs for a crosshead diesel engine; (2) calculating from said parameter(s) or input(s) the amount of performance enhancer(s), base lubricant or alternatively formulated lubricant that need be added to the engine's base lubricant; and (3) modifying said base lubricant with said performance enhancers, additional base lubricant or alternatively formulated lubricant before introduction the combination into said monitored part or location.

11 Claims, 1 Drawing Sheet

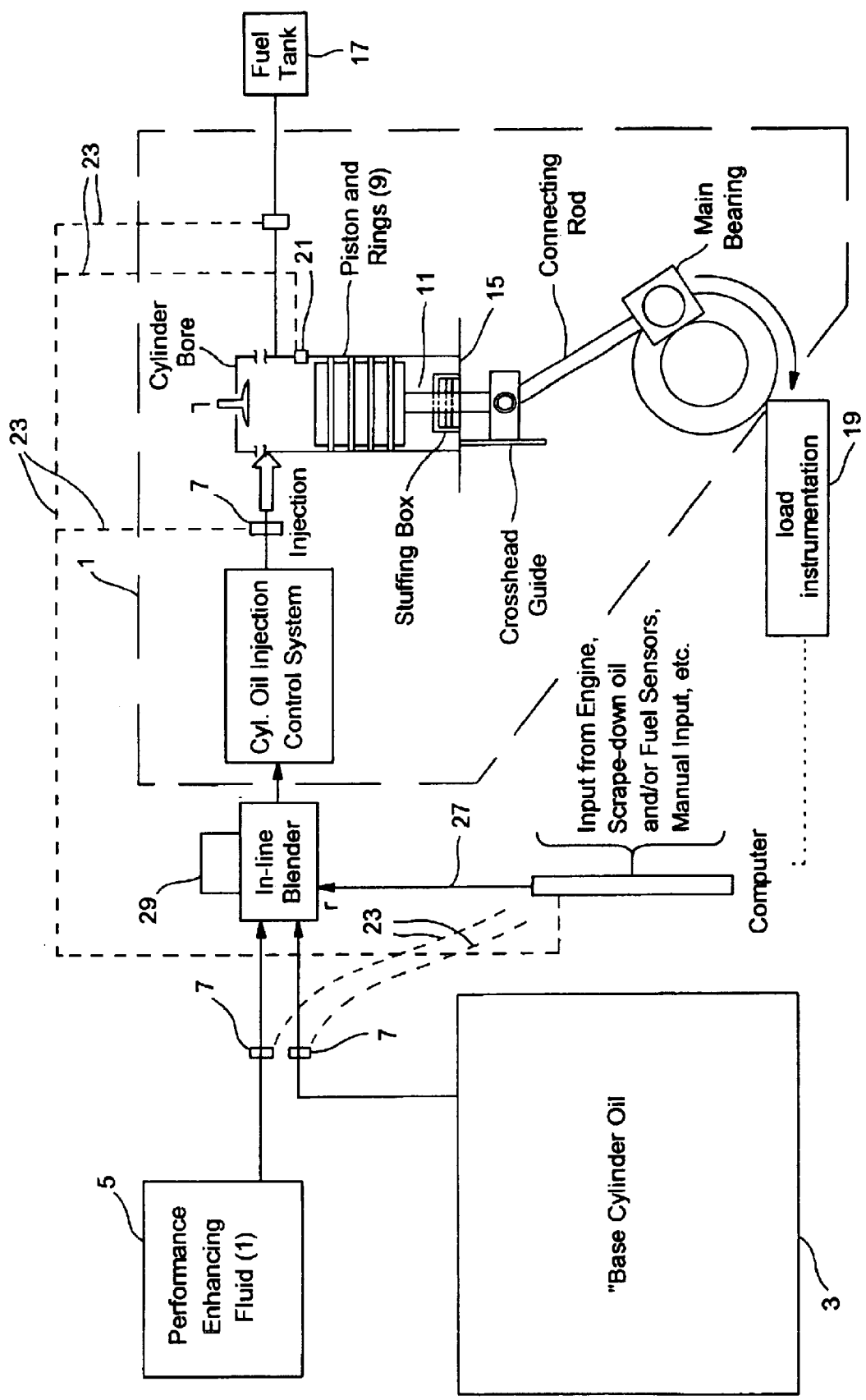

MODIFICATION OF LUBRICANT PROPERTIES IN AN OPERATING ALL LOSS LUBRICATING SYSTEM

CROSS REFERENCE TO RELATED APPLICATION(S)

Non-Provisional Application based on Provisional Application No. 60/361,376 filed Feb. 26, 2002

FIELD OF THE INVENTION

The present invention relates to an apparatus and a process for on-line modification of an engine's lubricant's properties in an all-loss system in response to actual engine conditions.

BACKGROUND OF THE INVENTION

Diesel engines may generally be classified as slow-speed, medium-speed or high-speed engines, with the slow-speed variety being used for the largest, deep draft vessels and in industrial applications. Slow-speed diesel engines are typically direct coupled, direct reversing, two-stroke cycle engines operating in the range of about 57 to 250 rpm and usually run on residual fuels. These engines are of crosshead construction with a diaphragm and stuffing boxes separating the power cylinders from the crankcase to prevent combustion products from entering the crankcase and mixing with the crankcase oil. Medium-speed engines typically operate in the range of 250 to about 1100 rpm and may operate on the four-stroke or two-stroke cycle. These engines are trunk piston design, and many operate on residual fuel as well. They may also operate on distillate fuel containing little or no residua. On deep-sea vessels these engines may be used for propulsion, ancillary applications or both. Slow speed and medium speed marine diesel engines are also extensively used in power plant operations. The present invention is applicable to them as well.

Each type of diesel engine employs lubricating oils to lubricate piston rings, cylinder liners, bearings for crank shafts and connecting rods, valve train mechanisms including cams and valve lifters, among other moving members. The lubricant prevents component wear, removes heat, neutralizes and disperses combustion products, prevents rust and corrosion, and prevents sludge formation or deposits.

In low-speed marine crosshead diesel engines, the cylinders and crankcase are lubricated separately, with cylinder lubrication being provided on a once-through basis by means of injection devices that apply cylinder oil to lubricators positioned around the cylinder liner. This is known as an "all-loss" lubrication system. The cylinder oil is typically formulated to provide for good oxidation and thermal stability, water demulsability, corrosion protection and good antifoam performance. Alkaline detergent additives are also present to neutralize acids formed during the combustion process. Dispersant, antioxidant, antifoam, antiwear and extreme pressure (EP) performance may also be provided by the use of suitable additives.

As engines produce higher power and are operated under more severe conditions, the lubricating oil's required functionality and performance have dramatically increased. These increased performance demands have resulted in a corresponding increase in the lubricant's expense. Lubricants are being made with increasingly sophisticated and expensive base stocks, including wholly synthetic base stocks. In addition, a wide variety of expensive additives, such as dispersants, detergents, antiwear agents, friction reducing agents, viscosity improvers, viscosity thickeners, metal passivators, acid sequestering agents and antioxidants are incorporated into the lubricants to meet functional demands.

Lubricants are designed to manage many engine condition parameters. One particularly important function of lubricating oils is to ensure the smooth operation of engines under every condition by limiting or preventing the wear and seizure of engine parts. Similarly, another engine condition parameter is the formation of carbonaceous type deposits, which is obviously undesirable and is managed by the lubricant's properties. The lubricant also manages other important engine condition parameters such as heat transfer, neutralization of combustion by-products, prevention of blowby, corrosion prevention, metal passivation and maintenance of lubricant film thickness. This list is not meant to be exhaustive and one of ordinary skill in the art recognizes many other important engine parameters managed by the lubricant.

No previous art has been identified concerning the modification of the properties of the incoming lubricant stream in response to engine conditions in an "all loss" system. However, various methods of replacing the lubricant or extending lubricant life in recirculating systems have been proposed. Those methods focused on maintaining a lubricant within known specification levels or replenishing additive concentration as opposed to actually responding to the real time or near real time needs of the operating engine.

Specifically, the previous art taught that when additive concentration levels in sump oil fell below a pre-set trigger, the engine was stopped and the entire lubricating oil was replaced. An improvement on this method allowed for large quantities of the sump oil to be removed and replaced with fresh lubricant during operation. Later practitioners improved upon this method to extend a recirculating lubricant's useful life by injecting additive into the sump when the additive concentrations had been depleted below a preset level.

The early methods of total or near total lubricant replacement were wasteful because they jettisoned many expensive components if only one additive concentration was lacking. These methods were further deficient in that the concentration of an additive did not necessarily correlate to the actual effectiveness of the lubricant inside the engine at any given point. Even if it did, substantial research has demonstrated that the concentration of the additive in the sump was not an accurate reflection of the additive concentration at the lubrication point of interest. See Malcolm Fox, et al., "Composition of Lubricating Oil in the Upper Ring Zone of an Internal Combustion Engine", *Tribology International,* Vol. 24 No. 4, pp. 231–33 (August 1991). Therefore, these methods were not widely adopted as they did not ensure that the engine's actual lubrication needs would be fulfilled.

SUMMARY OF THE INVENTION

The present invention relates to a system and a process for real time varying of an "all loss" diesel engine's lubricating oil's properties or flow rate in response to actual engine lubrication requirements. Preferably, the present invention provides a system and a method for the in situ monitoring of the lubricating oil's effectiveness and for modifying its properties and/or flow rate in response to the actual wear or corrosion needs of the machinery or engine. More preferably, the present invention provides a system and method for determining the lubricating oil's effectiveness in a two-stroke crosshead diesel engine and providing a means to adjust the lubricant's effectiveness by the controlled addition of at least one secondary fluid selected from performance enhancers, additional base lubricants, alternatively formulated lubricants or diluents.

BRIEF DESCRIPTION OF THE DRAWING

The drawing is a schematic cross-section of the this device applied to a crosshead diesel engine.

DETAILED DESCRIPTION

The increased performance demands of modern diesel engines have resulted in their mounting sophistication, complexity and sensitivity. In response, cylinder oils have also become more advanced by utilizing more complex base stocks and additives. However, such innovations also provoke higher costs in both the base stocks and the additives.

The engine condition parameter of interest, such as wear, deposits or corrosion, may be measured directly or may be predicted from other engine or fuel parameters. As a nonlimiting example, the wear of a component of interest could be directly measured by determining the metal or metal oxide particles present in the scrape down lubricant from the cylinder liner. In the alternative, wear may also be predicted from other parameters. For example, research has shown that cylinder wear in a two-stroke diesel engine may be accurately predicted from the sulfur content of the fuel, the load on the engine, and the total base number ("TBN") of the lubricant entering the cylinder. See Vince Carey and J. Fogarty, "Key Parameters in Cylinder Oil Performance and Crosshead Diesel Lubrication", *Proceedings of the 21$^{st}$ International Congress of Combustion Engines*, p. D63, 1995, incorporated herein by reference. Thus, the wear of the cylinder may be measured directly or accurately predicted from other parameters.

Further, studies have demonstrated that to achieve the bare minimum lubrication protection required for a two-stroke crosshead engine, lubricant flow should be modified in response to the prevailing engine operating and fuel conditions. See S. N. Yoo, O. S. Kwon, C. R. Son, "Service Experience of the Largest Diesel Engine Power Plant with Hyundai—MAN B&W 12K90MS-S Engines", *Proceedings of the 27$^{th}$ International Congress of Combustion Engines*, p. 160, 2001. The present invention is well suited for crosshead diesel engines because instead of wastefully varying the lubricant's flow rate, the present invention modifies the lubricant properties in response to the wear conditions.

The drawing details a non-limiting example of the present invention, adapted for use to prevent wear in the piston rings and cylinder of a marine diesel crosshead engine. Because the lubricant is either consumed or discharged into the scavenge space of the engine and is not designed to be recycled, this type of lubrication system is known as an all-loss system. In this example, the present invention comprises a crosshead diesel engine (1) with a base cylinder oil tank (3) containing a lubricant. Additional storage contains at least one secondary fluid which is a source (5) of a performance enhancer, base lubricant or alternatively formulated lubricant of known properties.

The wear of the piston rings (9) and the cylinder liner (11) may be either directly or predictively measured. For direct measurement, as a nonlimiting example, the metal or metal oxide content of the scrape down oil (13) leaving the cylinder collected from the scavenge space (15) may be determined. Predictive measurements may include determining the TBN of the lubricant in the scavenge space, the sulfur content of the fuel (monitored (17) or determined in the fuel tank), the load on the engine (19), cylinder temperature (21), etc.

These inputs (23) are employed in an algorithm (either digitally computed (25) or manual) which determines the amount of secondary fluid(s) that need be introduced into the lubricant to limit wear. While it is preferred that this be done automatically, manual calculation may suffice when the engine operating conditions and inputs vary slowly or infrequently. In most operating conditions, varying the lubricant properties by the addition of a secondary fluid is sufficient and the most effective manner in which to ensure proper lubrication. However, under certain conditions, the flow rate of the lubricant may also need be adjusted by the algorithm for the most efficient use of lubricants and secondary fluids and to ensure proper lubrication. The inventors would expect that the real world implementation of the present invention would allow the algorithm to control both the addition of secondary fluid and the varying of base lubricant flow rate.

A signal (27) is sent to the blender (29) which combines the additional performance enhancer(s) with the base lubricant before being injected into the cylinders. The blending means may be as simple as injecting the secondary fluid into the base lubricant allowing the flow currents to mix them. Other mixing or stirring devices, such as paddle, venturi or screw devices, could be employed. This list is not meant to be a complete list of blending means and one of ordinary skill in the art may easily determine other means of blending the secondary fluid into the base lubricant. While preferable, it is not a requirement of the present invention that the secondary fluid be extensively or completely blended into the base lubricant. The only requirement is that the introduction of the secondary fluid affects the engine condition parameter of interest. It is expected that sufficient protection would be provided to all cylinders by monitoring only one cylinder, however, the present invention allows for the monitoring and blending for each individual cylinder.

The present invention provides at least three distinct advantages over previous teachings. First, the present invention does not need to monitor, nor determine the properties of the lubricant entering the cylinder liner. This information is not necessary as the present invention monitors and reacts to a specific lubricant function at a specific location or part within the engine. The prior art monitored and replenished used oil additive concentration going into the engine, which does not necessarily correlate to the lubricant performance. The present invention modifies lubricant properties in a direct response to a measured engine stress and/or the lubricant's effectiveness at or near the critical component (e.g., cylinder liner, piston rings, etc.).

Second, the present invention instantly detects engine degradation because it monitors actual engine degradation conditions at the point of interest as opposed to the previous teaching of monitoring additive levels after they have been diluted by mixing into the sump or reservoir. As in the example previously noted, the engine wear was measured directly at the cylinder, the cylinder liner or in the lubricating oil immediately after discharge from the cylinder space. Indeed, this feature of the present invention allows it to be used on "all-loss" lubricating systems, a functionality not found in the prior art. Thus, the present invention is applicable to diesel two-stroke engines whereas the previous art was not applicable.

Finally, the present invention is far more economical because it only supplements the base lubricant with the specific secondary fluid as necessary in response to the actual lubrication requirements as opposed to the complete or significant replacement of the entire lubricant in response to a preset trigger. Not only does the present invention actually protect the engine from wear, deposits or other degradations of concern, but it does so in the most economic way instantly tailoring the properties of the lubricant to overcome the stress encountered by the engine.

What is claimed is:

1. A process for the modification of a system's base lubricant's properties during engine operations comprising:
   a) regularly monitoring, directly or indirectly, one or more engine condition parameters in an engine with an all-loss lubricating system,
   b) calculating from said engine condition parameters an amount of a secondary fluid to add to said base lubricant, said secondary fluid being one or more fluids selected from the group comprising performance enhancers, base stocks or additional formulated lubricants,
   c) mixing said base lubricant with said secondary fluid creating a modified base lubricant,
   d) applying said modified base lubricant to said engine during engine operations.

2. A process as in claim 1 where said engine is a two-stroke diesel engine.

3. A process as in claim 2 wherein the engine condition parameter is monitored at a pre-selected engine part or location of interest.

4. A process as in claim 3 where said engine part of interest is a cylinder liner.

5. A process as in claim 3 where said engine part of interest is a piston ring.

6. In the lubrication of a two-stroke crosshead diesel engine during engine use wherein a base lubricant is supplied to the one or more of the engine's cylinders, cylinder liners or piston rings during engine use and not recirculated, the improvement comprising modifying the lubricant's properties during engine use in response to engine lubrication requirements by:
   a) regularly measuring one or more of said engine's condition parameters, directly or indirectly, at one or more of said engine's cylinders, cylinder liners or piston rings, by measuring one or more item selected from a group consisting of
   metal wear, deposit formation, blow-by, heat transfer, corrosion, the scrape-down oil's metal content, scrape-down oil's metal oxide content, scrape-down oil's acidity, the scrape-down oil's TBN, scrape-down oil's capacitance, scrape-down oil's film thickness, scrape-down oil's viscosity, the scrape down oil's water content, the scrape down oil's oxidation, the scrape down oil's nitration, the scrape down oil's soot content, the scrape down oil's carbonate content, the scrape down oil's sulfate content, the scrape down oil's surface tension, the fuel sulfur content, exhaust $SO_x$ content, exhaust $NO_x$ content, exhaust gas temperature, cylinder liner temperature, coolant temperature, engine r.p.m. and engine load;
   b) calculating from said engine condition parameters an amount of secondary fluid to be added to said base lubricant,
   said secondary fluid being one or more fluids selected from the group consisting of performance enhancers, base stocks, and additional formulated lubricants,
   said performance enhancers being one or more items selected from a group consisting of detergents, dispersants, antioxidants, antiwear agents, friction-reducing agents and viscosity improvers, viscosity thickeners, extreme pressure additive, metal passivators, acid sequestering agents or a mixture thereof;
   c) mixing said base lubricant with said calculated amount of said secondary fluid creating a modified base lubricant; and
   d) supplying said modified base lubricant to one or more of said cylinders, cylinder liners or piston rings during engine operations.

7. An apparatus for the on-line modification of base lubricant properties comprising:
   a) an engine employing one or more base lubricants in an all loss lubrication system,
   b) at least one secondary fluid selected from a group consisting of performance enhancers, base lubricants or additional formulated lubricants,
   c) a measuring device to determine, directly or indirectly, the value of at least one engine condition parameter,
   d) a calculating device operating on one or more of said value of said engine condition parameters that determines the amount of said secondary fluid to add to said base lubricant, and
   e) a blending means to mix said base lubricant and said secondary fluid into a mixture prior to said mixture's introduction to said engine part or engine area of interest.

8. An apparatus as in claim 7 wherein said engine is a two-stroke diesel engine.

9. An apparatus as in either claim 8 wherein said engine condition parameter is determined by measuring one or more items selected from the group consisting of
   metal wear, deposit formation, blow-by, heat transfer, corrosion, the scrape-down oil's metal content, scrape-down oil's metal oxide content, scrape-down oil's acidity, the scrape-down oil's TBN, scrape-down oil's capacitance, scrape-down oil's film thickness, scrape-down oil's viscosity, the scrape down oil's water content, the scrape down oil's oxidation, the scrape down oil's nitration, the scrape down oil's soot content, the scrape down oil's carbonate content, the scrape down oil's sulfate content, the scrape down oil's surface tension, the fuel sulfur content, exhaust $SO_x$ content, exhaust $NO_x$ content, exhaust gas temperature, cylinder liner temperature, coolant temperature, engine r.p.m. and engine load.

10. An apparatus as in claim 9 wherein said secondary fluid being one or more fluids selected from the group consisting of
    performance enhancers, base stocks, or additional formulated lubricants or a mixture thereof,
    wherein said performance enhancers being one or more items selected from a group consisting of detergents, dispersants, antioxidants, antiwear agents, friction-reducing agents and viscosity improvers, viscosity thickeners, extreme pressure additive, metal passivators, acid sequestering agents or a mixture thereof.

11. An apparatus that modifies the lubricant properties of one or more base lubricants in an operating engine comprising
    a) a two-stroke crosshead diesel engine with an all-loss lubricating system utilizing said base lubricant;
    b) at least one secondary fluid selected from a group consisting of performance enhancers, base stocks or additional formulated lubricants, wherein said performance enhancers being one or more fluids selected from a group consisting of detergents, dispersants, antioxidants, antiwear agents, friction-reducing agents and viscosity improvers, viscosity thickeners, extreme pressure additive, metal passivators, acid sequestering agents or a mixture thereof;

c) at least one measuring device to determine, directly or indirectly, the value of an engine condition parameter by measuring an item selected from a group consisting of metal wear, deposit formation, blow-by, heat transfer, corrosion, the scrape-down oil's metal content, scrape-down oil's metal oxide content, scrape-down oil's acidity, the scrape-down oil's TBN, scrape-down oil's capacitance, scrape-down oil's film thickness, scrape-down oil's viscosity, the scrape down oil's water content, the scrape down oil's oxidation, the scrape down oil's nitration, the scrape down oil's soot content, the scrape down oil's carbonate content, the scrape down oil's sulfate content, the scrape down oil's surface tension, the fuel sulfur content, exhaust $SO_X$ content, exhaust $NO_X$ content, exhaust gas temperature, cylinder liner temperature, coolant temperature, engine r.p.m. and engine load;

said engine part or area of interest being selected from a group consisting of the cylinder, the cylinder sleeve, scavenge space or the piston rings;

d) a calculating device operating on an algorithm operating on one or more of said value of said engine condition parameters that determines the amount of said secondary fluid to add to said base lubricant;

e) a blending means to mix said base lubricant with said secondary fluid prior to the resultant mixture's introduction into said engine part or engine area of interest.

* * * * *